US005559980A

United States Patent [19]

Connors et al.

[11] Patent Number: 5,559,980

[45] Date of Patent: Sep. 24, 1996

[54] METHOD AND APPARATUS FOR DETECTING REFERENCES TO DEALLOCATED MEMORY IN A DYNAMIC MEMORY ALLOCATION SYSTEM

[75] Inventors: Paul A. Connors, Broomfield; Alan L. Robertson, Westminster, both of Colo.

[73] Assignee: Lucent Technologies Inc., Murray Hill, N.J.

[21] Appl. No.: 32,918

[22] Filed: Mar. 18, 1993

[51] Int. Cl.$^{6}$ .............................. G06F 12/02; G06F 12/10

[52] U.S. Cl. .................... 395/427; 395/497.02; 395/412; 395/600; 395/650; 395/183.14; 395/183.18; 364/256.6; 364/267.91; 364/282.2; 364/967.5; 364/DIG. 1

[58] Field of Search .................................... 395/425, 575, 395/412, 413, 416, 418, 419, 427, 481, 486, 487, 650, 183.14, 183.13, 183.18, 182.03, 182.06, 185.01, 185.1, 497.02, 497.01, 497.04, 600; 364/DIG. 1

[56] References Cited

U.S. PATENT DOCUMENTS

| | | | |
|---|---|---|---|
| 4,231,088 | 10/1980 | Hammer et al. | 395/823 |
| 4,356,550 | 10/1982 | Katzman et al. | 395/182.12 |
| 4,577,274 | 3/1986 | Ho et al. | 395/415 |
| 4,811,216 | 3/1989 | Bishop et al. | 395/480 |
| 4,989,134 | 1/1991 | Shaw | 395/600 |
| 5,111,384 | 5/1992 | Aslanian et al. | 395/183.02 |
| 5,193,180 | 3/1993 | Hastings | 395/183.11 |
| 5,301,288 | 4/1994 | Newman et al. | 395/412 |
| 5,313,611 | 5/1994 | Franklin et al. | 395/416 |
| 5,355,469 | 10/1994 | Sparks et al. | 395/183.14 |

OTHER PUBLICATIONS

Andy Valencia and Taed Nelson, Text of Utility Software for Checking Misuse of Allocated Memory on UNIX (exact publication date not known).

Quote of the *C Users Journal,* Jun. 1992, p. 69, last paragraph, regarding Electric Fence program for detecting malloc buffer overruns.

Bruce Perens, Text of Electric Fence program, as of Mar. 27, 1992.

Bruce Perens, Text of Electric Fence 2.0 program as of Apr. 27, 1993 (exact publication date not known).

Bach, Maurice J. "The Design of the UNIX Operating System", 1986 Prentice–Hall, Inc. Englewood Cliffs, NJ. pp. 146–160, 191–232, 271–308.

*Primary Examiner*—Glenn Gossage
*Attorney, Agent, or Firm*—David Volejnicek

[57] ABSTRACT

A system and means for identifying references by a process or a subprogram of a process to deallocated memory in a dynamic memory allocation system. The system and method are effective in identifying such references even before they have manifested themselves, and also in identifying the perpetrators of such references. The system and method make use of that portion of the address space of the process which is not otherwise used. A dynamic memory allocation function responds to a requestor's request for memory allocation by mapping memory which the function is allocating to the requestor into otherwise-unused virtual address space, recording this mapping in the system's memory map, and returning the virtual address to the requestor for use in referencing the allocated memory. Hence, any attempted access by the requestor to the allocated memory uses the virtual address, and the virtual address must be translated through the process memory map before the access can be established. A dynamic memory deallocation function responds to a requestor's request for memory deallocation by deleting from the process memory map the mapping between the memory which is being deallocated and the corresponding virtual address. Hence, any subsequent attempted access by the requestor to the deallocated memory fails on account of the corresponding entry in the process memory map being empty and thus unavailable for completion of the requisite address translation. This failure is trapped, recorded, and reported by the system's conventional fault-management mechanisms.

27 Claims, 5 Drawing Sheets

PROCESS 30
ADDRESS SPACE 100 OF PROCESS 30
MEMORY MAP 80 OF PROCESS 30
MEMORY 12
PERMANENTLY ALLOCATED MEMORY
135
DYNAMICALLY ALLOCATED MEMORY
137
136
101
141
120
13
USED 102
UNUSED 103
MALLOC POOL 44

PROCESS 30
ADDRESS SPACE 100 OF PROCESS 30
MEMORY MAP 80 OF PROCESS 30
MEMORY 12
PERMANENTLY ALLOCATED MEMORY
135
DYNAMICALLY ALLOCATED MEMORY
137
137
137
136
101
141
USED 102
UNUSED 103
120
13
13
MALLOC POOL 44

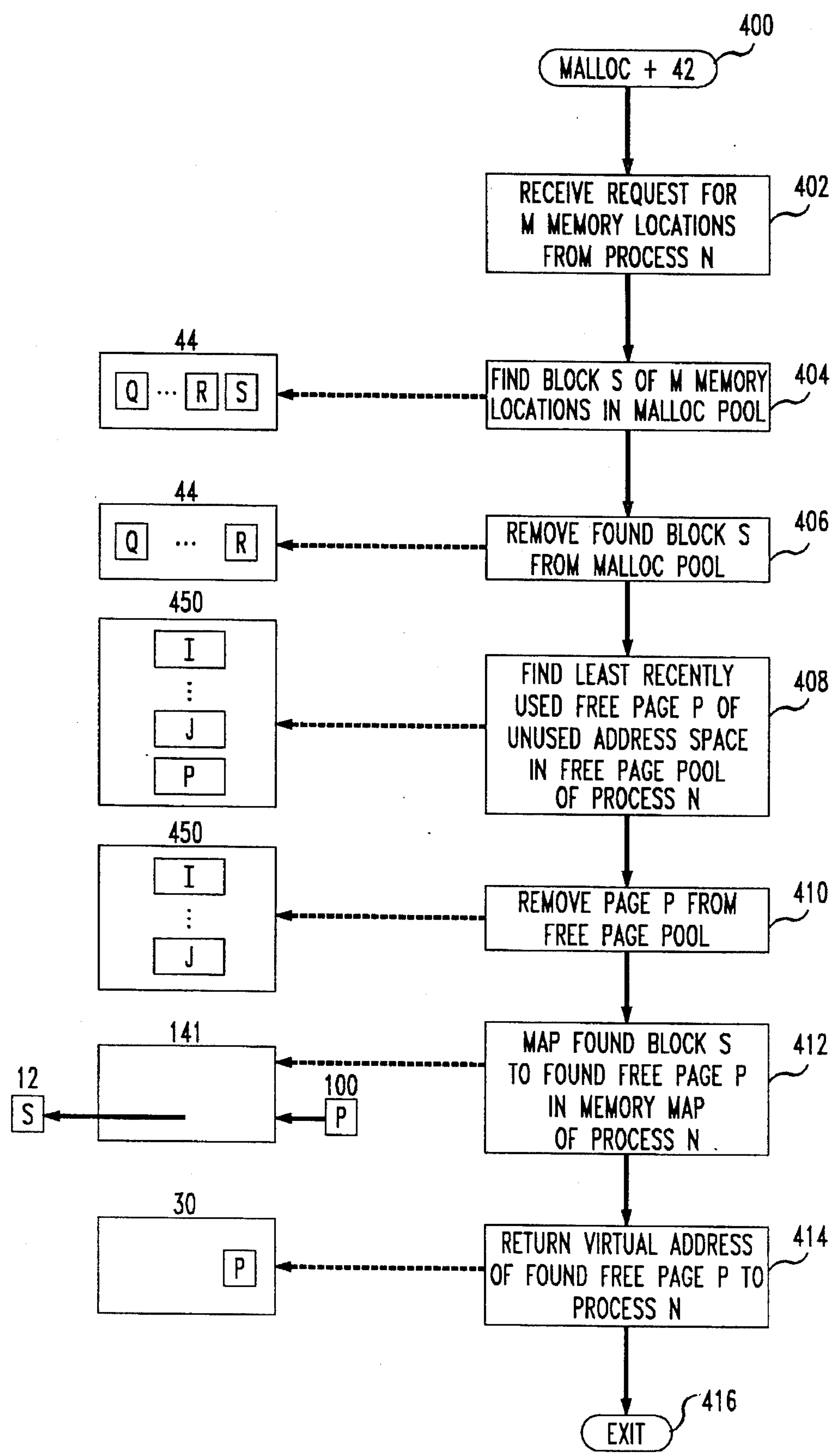
FIG. 4
400
MALLOC + 42
RECEIVE REQUEST FOR M MEMORY LOCATIONS FROM PROCESS N
402
44
Q ··· R S
FIND BLOCK S OF M MEMORY LOCATIONS IN MALLOC POOL
404
44
Q ··· R
REMOVE FOUND BLOCK S FROM MALLOC POOL
406
450
I
J
P
FIND LEAST RECENTLY USED FREE PAGE P OF UNUSED ADDRESS SPACE IN FREE PAGE POOL OF PROCESS N
408
450
I
J
REMOVE PAGE P FROM FREE PAGE POOL
410
141
12
S
100
P
MAP FOUND BLOCK S TO FOUND FREE PAGE P IN MEMORY MAP OF PROCESS N
412
30
P
RETURN VIRTUAL ADDRESS OF FOUND FREE PAGE P TO PROCESS N
414
416
EXIT

METHOD AND APPARATUS FOR DETECTING REFERENCES TO DEALLOCATED MEMORY IN A DYNAMIC MEMORY ALLOCATION SYSTEM

TECHNICAL FIELD

This invention relates to dynamic memory allocation computer systems.

BACKGROUND OF THE INVENTION

A process is a fundamental entity of control within a computer system. A process comprises a set of executable code, i.e., a program, and private data space, i.e., allocated memory. Memory is allocated to a process when the process is created in the computer system. In many computer systems, a process is constrained to use only the memory that it was allocated at its creation. This makes it simple to ensure that a process does not mis-use another process' memory. Illustratively, a memory map is created, that shows which portions of memory are assigned to which processes, and this map is used to detect any attempt by a process to access memory that is not allocated to that process. An example of such a system is disclosed in U.S. Pat. No. 4,356,550 (see cols. 61–72).

Dynamic memory allocation computer systems are a class of computer systems that allow an executing process to request allocation of additional memory for its exclusive use during execution, and to request that no-longer needed dynamically-allocated memory be deallocated and thereby freed for use by other processes. Mis-use of memory that had once been allocated to a process and now is allocated to a different process may be detected through the memory-map mechanism referred to above. However, this mechanism is not capable of detecting memory mis-use within a process, and indeed failures of dynamic memory allocation computer systems commonly result from incorrect use of dynamically allocated memory. These failures can be catastrophic to the end user, and expensive for the system developer to find and eliminate. Particularly common and difficult to discover is the error where memory that was once dynamically allocated to a function, routine, procedure, or some other subprogram within a process, continues to be referenced by that subprogram after it has freed that memory. If that memory has been allocated to another subprogram subsequently to being freed by the first subprogram and the first subprogram writes the memory, the second subprogram's data stored in the memory will be destroyed and the second subprogram will use the wrong data, causing unpredictable behavior. And if the first subprogram reads the memory after the second subprogram has written it, the first subprogram's data stored in the memory will have been destroyed, and the first subprogram will use the wrong data, also causing unpredictable behavior.

These errors may cause a process to produce incorrect results without giving any indication that anything is wrong. But even if these errors cause the process to crash, finding the cause of the crash may be next-to-impossible due to the dynamic nature of the system, which will likely cause the error to manifest itself only occasionally and in different places during repeat iterations of execution of the process. These consequences of the dynamic nature of the system make conventional tools—conventional debuggers, tracers, memory dump analyzers, and system test procedures, to name a few—particularly inadequate to find the sources of these errors or to detect that the potential for such errors even exists in the system.

SUMMARY OF THE INVENTION

This invention is directed to solving these and other problems and disadvantages of the prior art. Generally and illustratively according to the invention, there is provided an arrangement that is not only effective in identifying the perpetrators of references to deallocated memory but also in identifying invalid references even before they have manifested themselves, e.g., before they have caused problems, yet runs on the host system without requiring any special hardware support. The arrangement makes use of a portion of the virtual space of a process which is not otherwise used. A dynamic memory allocation function responds to a subprogram's request for memory allocation by mapping memory which the function is allocating to the subprogram into the otherwise-unused address space, recording this mapping in the process' memory map, and returning the virtual address to the requesting subprogram for use in referencing the allocated memory. Hence, any attempt by the subprogram to access the allocated memory uses the virtual address, and the virtual address must be translated through the process' memory map before the access can be established. A dynamic memory deallocation function responds to a subprogram's request for memory deallocation by deleting from the process' memory map the mapping between the memory which is being deallocated and the corresponding virtual address. Hence, any subsequent attempted access by the subprogram to the deallocated memory fails on account of the corresponding entry in the process' memory map being empty and thus unavailable for completion of the requisite address translation. This failure is trapped, recorded, and reported by the system's conventional fault-management mechanisms.

Further illustratively, the arrangement characterized above is not limited in use to detecting memory mis-use by components of a single process, but may be used equally well in place of the conventional arrangement to detect memory mis-use between different processes. Furthermore, the arrangement may be used for purposes other than detecting memory mis-use. For example, it may be used to detect and keep track of individual valid memory references. In such an application, the dynamic memory allocation function does not record the mapping of addresses from the second, unused, address space portion in the memory map, but records it in a separate data structure. Hence, any memory reference, whether valid or invalid, by a process fails during address translation, and this event is duly trapped and recorded. The event handler then supplies the mapping information for valid memory references from the separate data structure to the address translation function, whereby valid memory references are enabled to proceed.

Specifically according to the invention, reference by a requestor (e.g., a process or a subprogram of a process) to a memory location is selectively detected in a dynamic memory allocation system. The system has memory which includes a plurality of memory locations each having a corresponding first address for use in accessing the memory location. The system further has an address space, and a memory map for representing a mapping of addresses from the address space to the memory locations. The map represents a mapping of the addresses from a first portion of the address space that resides in the memory, to the memory locations. The system also has a dynamic memory allocation (referred to herein as "malloc") function that responds to a dynamic memory allocation request by allocating a memory location to the requestor, and a dynamic memory deallocation (referred to herein as "free") function that responds to a dynamic memory deallocation request by deallocating the allocated memory location from the requestor. The system further has an address translation function that responds to the requestor referencing the memory location with an address that is mapped to the memory location, and uses the memory map to translate the referencing address to the memory location's first address, for use of the first address in accessing the location in response to the reference. In response to allocation of a memory location to a requestor, a presently-unmapped second address, from a second portion of the address space that is presently not used, is mapped—illustratively in the memory map—to the allocated memory location, and the second address is given to the requestor for referencing the allocated memory location. The mapping thus makes it possible for the address translation function to perform its address translation task in response to the requestor referencing the allocated memory location with the second address. In response to deallocation of the memory location from the requestor, the mapping of the second address to the deallocated memory location is canceled—illustratively is deleted from the memory map. Hence, an attempt by the address translation function to translate the second address to the first address, in response to the requestor referencing the memory location with the second address, fails due to the unavailability of the canceled mapping. In consequence of the failure, the reference by the requestor to the memory location is detected. Advantageously, the detection will have been accomplished irrespective of whether the reference to the deallocated memory would have been harmful or harmless, It is thus possible to anticipate problems that may only manifest themselves at some time in the future, or that may never manifest themselves at all.

Preferably, once the second address is unmapped from the memory location by way of cancellation of the mapping, that second address is not used again for as long as possible. By maximizing the interval between reuses of the second address, the probability of detecting any reference by a requestor to deallocated memory is maximized.

These and other advantages and features of the invention will become more apparent from the following description of an illustrative embodiment of the invention considered together with the drawing.

BRIEF DESCRIPTION OF THE DRAWING

FIG. 4 is a functional flow diagram of the malloc+ function of the computer of FIG. 1;

DETAILED DESCRIPTION

Figure 1:
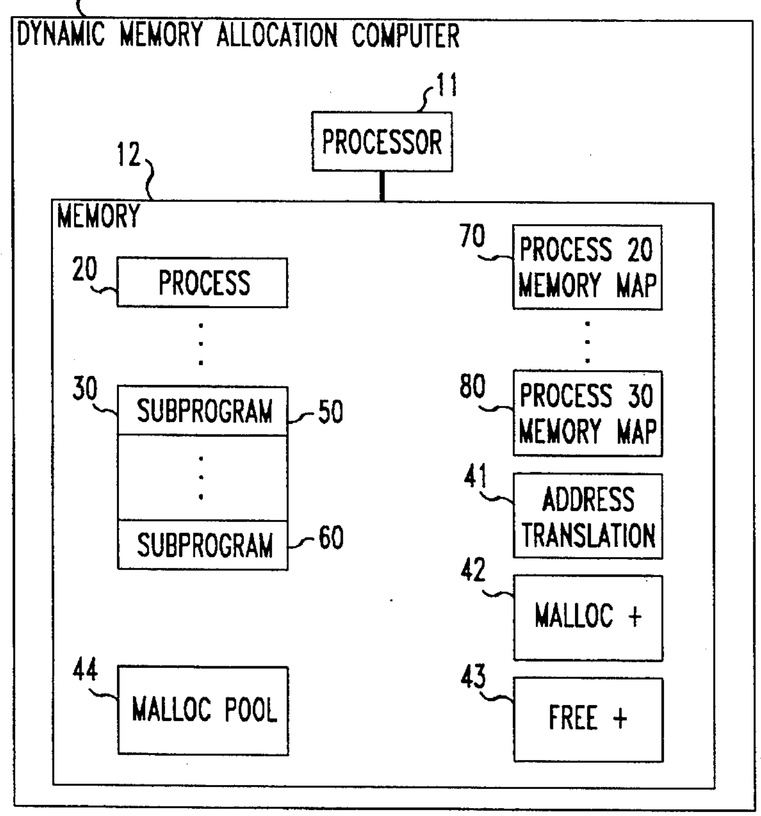
FIG. 1 is a block diagram of a dynamic memory allocation computer embodying an illustrative example of the invention.

FIG. 1 shows in generalized block form a dynamic memory allocation computer 10. Computer 10 is conventional in structure, and hence only elements thereof that are relevant to an understanding of the present invention are shown and are discussed below. Computer 10 includes one or more processing units (processor) 11 for executing processes, and a memory 12 for storing the processes and other information required by processor 11 for proper process execution. Memory 12 may include both main, on-line, memory and secondary, off-line, memory. Memory 12 stores processes 20–30 that are users of the dynamic memory allocation capability. Processes 20–30 may be any kind of processes, e.g., operating system processes, application-level or user processes, etc. At least one process—illustratively process 30—includes a plurality of subprograms 50–60.

The dynamic memory allocation capability is implemented by a memory allocation function malloc+42 and a memory deallocation function free+43. Function 42 allocates memory to processes 20–30 from a malloc pool 44 of presently free and available memory locations, while function 43 deallocates memory from processes 20–30 and returns it to malloc pool 44. Functions 42 and 43 are extensions of the conventional malloc and free functions; these extensions are discussed further below.

Memory 12 further stores a conventional address translation function 41 that implements conventional virtual memory in computer 10. As is well known and understood in the art, in a virtual memory system, locations of memory 12 are assigned virtual, or logical addresses, and system users such as processes 20–30 reference the virtual addresses rather than the real, physical, addresses of physical memory locations in memory 12. Of course, the virtual and physical addresses may be the same. A significant advantage of a virtual memory system is that the virtual, or logical, address space which is available for use by a system user may, and in all known practical instances does, exceed the actual physical space of the system's memory that is available for use by that user—an advantage that is utilized by the present invention, as discussed further below.

Finally, memory 12 includes conventional memory maps 70–80, one for each process 20–30. Inter alia, each memory map 70–80 shows, on a page-by-page basis, whether the corresponding page of virtual-memory of the corresponding process is or is not presently assigned to some use, and for the assigned pages indicates their mapping onto the physical memory, i.e., which page, if any, of memory 12 presently corresponds to that virtual page. Pages are same-size blocks of contiguous memory addresses. In conventional computer systems, page size typically varies between 4 kilobytes (KB) and 16 KB of addresses.

Figure 2:
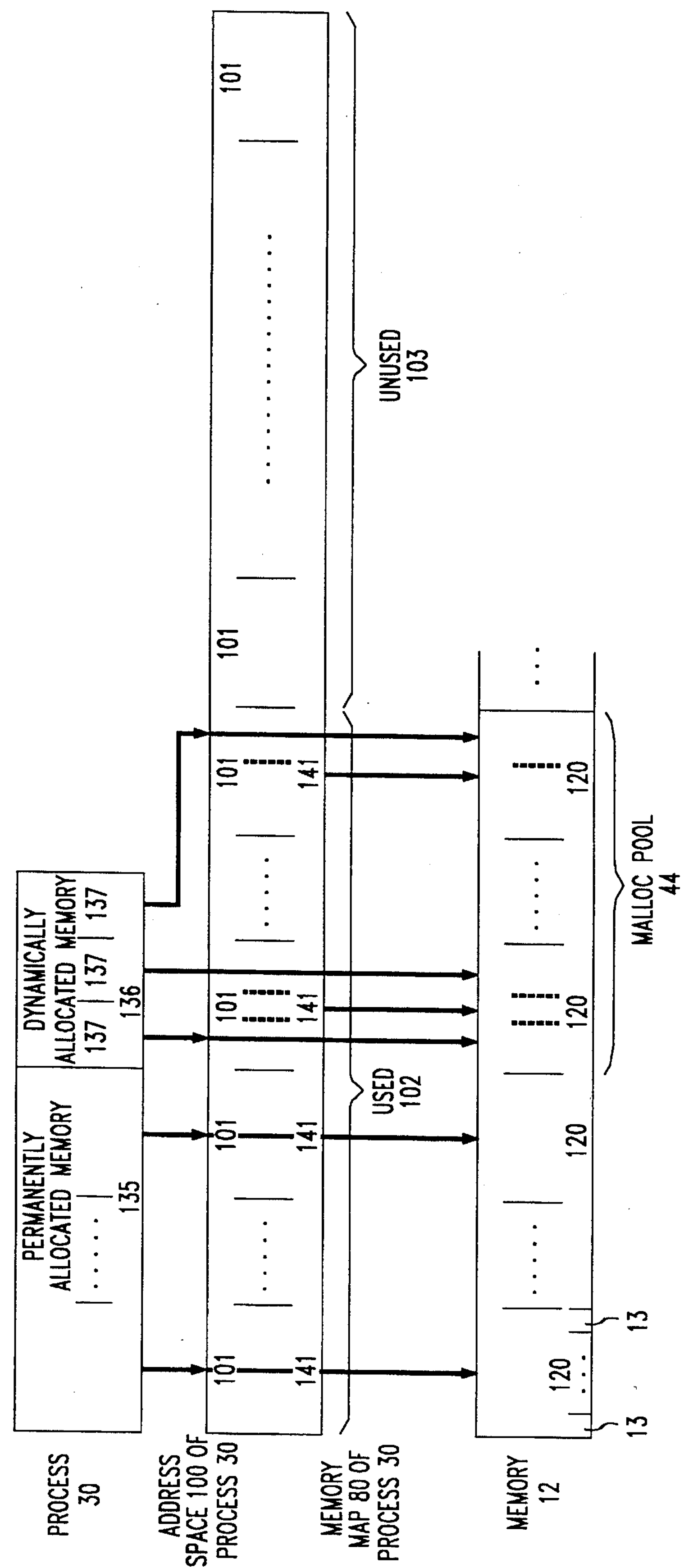
FIG. 2 is a logical block diagram of address mapping conventionally effected in a prior-art dynamic memory allocation computer.

Taking process 30 as an example of a dynamic memory allocation operation within computer 10, FIG. 2 shows the logical relationship that is established in the prior art by memory map 80 between virtual address space 100 of process 30 and memory 12. The virtual address space 100 consists of all addresses that can be generated and used in computer system 10 regardless of the physical size of its memory. Taking as an example 32-bit computer equipped with 16 megabytes (MB) of memory, its address space 100 is $2^{32}$ addresses, while its memory 12 has 16 million physical memory locations 13.

As was mentioned above, address space 100 of process 30 is conventionally much larger than physical space in memory 12 that is assigned for use by process 30. Hence, only a portion 102 of address space 100 can be mapped onto, i.e., reside in, memory 12 at any one time. This mapping is represented by memory map 80. Memory map 80 can have an entry 141 for each page 101 of addresses of virtual address space 100. For every page 101 of portion 102 of address space 100 that resides in memory 12, referred to as used portion 102, the corresponding entry 141 has a pointer to the page 120 of memory 12 to which page 101 is presently mapped. Pages 101 of that portion 103 of address space 100 that are not presently mapped to pages 120 of memory 12, referred to as unused portion 103, are effectively presently not being used by process 30. Memory map 80 entries 141 that correspond to pages 101 of unused portion 103 do not include pointers to pages 120 of memory 12.

Alternatively, memory map 80 does not include entries 141 for pages 101 of unused portion 103, but only creates these entities 141 when they become needed, i.e., when the corresponding pages 101 do become mapped to memory 12 or otherwise used.

Taking process 30 as illustrative of all processes 20–30, its allocated memory space comprises a permanently-allocated portion 135 that is allocated to process 30 at its creation, and a dynamically-allocated portion 136 that is allocated by the malloc function during execution of process 30. Portion 136 varies in size, and does not exist if process 30 has made no dynamic allocation requests or has freed all dynamically allocated memory. Generally, portion 136 comprises one or more segments 137 of varying numbers of memory locations 13, each representing malloc's response to one dynamic allocation request by processor 30.

Allocated memory 135 and 136 is generally represented in process 30 by virtual addresses, i.e., by elements of address space 100. Any references by process 30 to memory 12 therefore use virtual addresses, and these addresses must be translated by address translation function 41 into memory 12 addresses before accesses by process 30 to memory 12 can be accomplished. Address translation function 41 uses the mapping established by memory map 80 to effect the address translation. This is represented in FIG. 2 by arrows that point from elements of memory 135 and 136 that is allocated to process 30 to elements of memory 12 through elements of address space 100 and memory map 80 of process 30.

Figure 6:
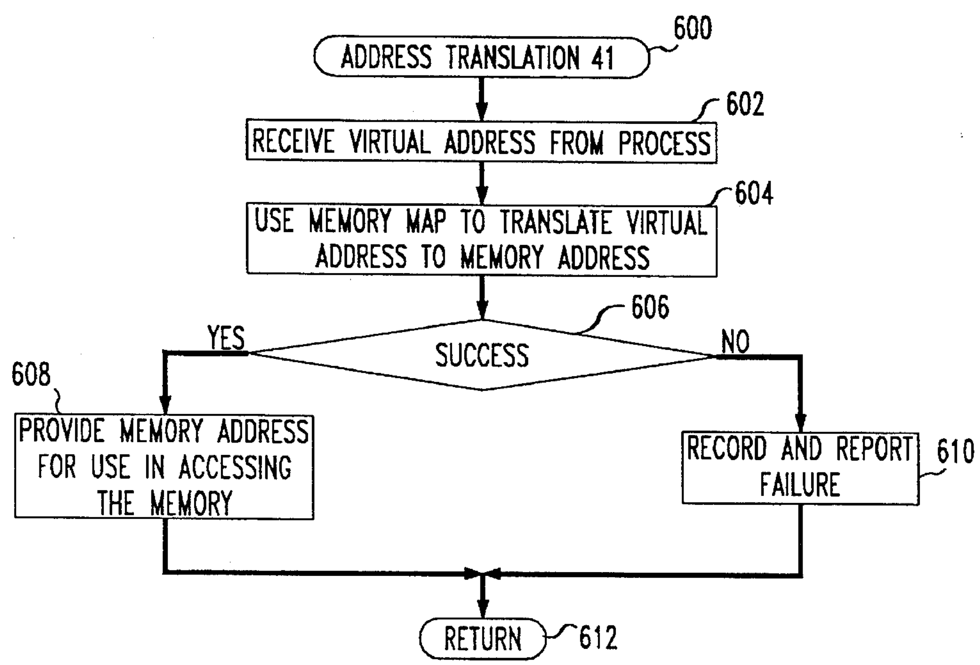
FIG. 6 is a functional flow diagram of the address translation function of the computer of FIG. 1.

The operation of address translation function 41 is represented in FIG. 6. Function 41 is invoked at step 600, and upon receiving a virtual address which a process subprogram has used to reference a memory location which the process seeks to access, at step 602, it uses the memory map of that process to translate the virtual address into an address of memory 12 that is suitable for accessing the memory location, e.g., the physical address, at step 604. If the translation succeeds, as determined at step 606, function 41 provides the memory address to processor 11, at step 608, which uses it to access the corresponding memory location on behalf of the process subprogram that referenced it. If, however, the translation fails, the failure is trapped, e.g., by means of an interrupt, and the interrupt handling routine records and reports the trapped failure as an error, at step 610. Following step 608 or 610, function 41 exits and returns to the point of its invocation, at step 612.

During conventional operation of system 10, when a subprogram 50–60 of executing process 30 makes a dynamic memory allocation request, malloc is invoked. It searches malloc pool 44 for the amount of free memory requested by process 30, and upon finding it removes it from malloc pool 44 and passes its virtual address to process 30. (Malloc typically works with virtual addresses of memory 12, and hence does not require the services of address translation function 41.) Process 30 then internally stores the received virtual address, and the requesting subprogram 50–60 uses it to access the dynamically allocated memory.

When the requesting subprogram 50–60 of process 30 no longer needs the dynamically allocated memory for the purpose for which it requested that memory to be allocated, it makes a dynamic memory deallocation request and free is invoked. Free receives the virtual address of the memory to be deallocated and returns the addressed portion of memory 12 back into malloc pool 44.

It is up to process 30 to erase any of its internal references to the now-deallocated memory. But this is where the problem arises. It sometimes happens that process 30 has a "bug", and either fails to check for and erase references to the now-deallocated memory at all, or fails to find and erase one or more such references. Hence, the requesting subprogram 50–60 of process 30 may attempt to access the now-deallocated memory. Unless the deallocated memory has been reallocated to another process, e.g., process 20, there is nothing in system 10 to recognize access by process 30 to that deallocated memory as an error and flag it or prevent it. Specifically, address translation function 41 takes the "yes" leg of the decision branch at step 606 to step 608 of FIG. 6.

According to the invention, the operation of conventional malloc and free are modified to effect detection and prevention of accesses by a process to deallocated memory. The results of the modification are malloc+42 and free+43. The aspects of their functionality that are relevant to an understanding of this invention are flowcharted in FIGS. 4 and 5, respectively.

When malloc+42 is invoked, at step 400 of FIG. 4, it initially proceeds in the conventional manner. Upon receiving a request from process N (e.g., process 30) for allocation of M locations of memory 12, at step 402, malloc+42 accesses malloc pool 44 and finds therein a block S of M memory locations, at step 404. If malloc+42 should fail to find a block S in malloc pool 44, it would handle the event in the usual, conventional, manner not germane to this discussion. Malloc+42 then removes the found block S from malloc pool 44, at step 406. The operation of malloc+42 now diverges from the conventional memory allocations process. Malloc+42 keeps a free page pool 450 of pages 101 of unused portion 103 of the address space of process N which are presently not mapped to any pages 120 of memory 12. Before malloc+42 is invoked for the first time, pool 450 includes all pages 101 of unused portion 103—as would always be the case for a conventional system 10. Malloc+42 finds and removes from free page pool 450 the least-recently used page P 101, at steps 408 and 410. Illustratively, free page pool 450 is implemented as a first in/first out queue, and malloc+42 retrieves the page 101 that appears at the head of the queue. Malloc+42 then maps the block S to free page P 101 in memory map 80, at step 412, by storing a pointer to block S of memory 12 in entry 141 of memory map of process N which corresponds to free page P 101 and thereby also representing the mapping of the block S to the free page P 101 in memory map 80. Malloc+42 then gives (e.g., returns) the virtual address of page P 101 within address space of process N to process N, at step 414, and exits, at step 416. Hence, process N has been given a virtual address for dynamically allocated memory segment S 137, which virtual address lies in unused portion 103.

Figure 3:
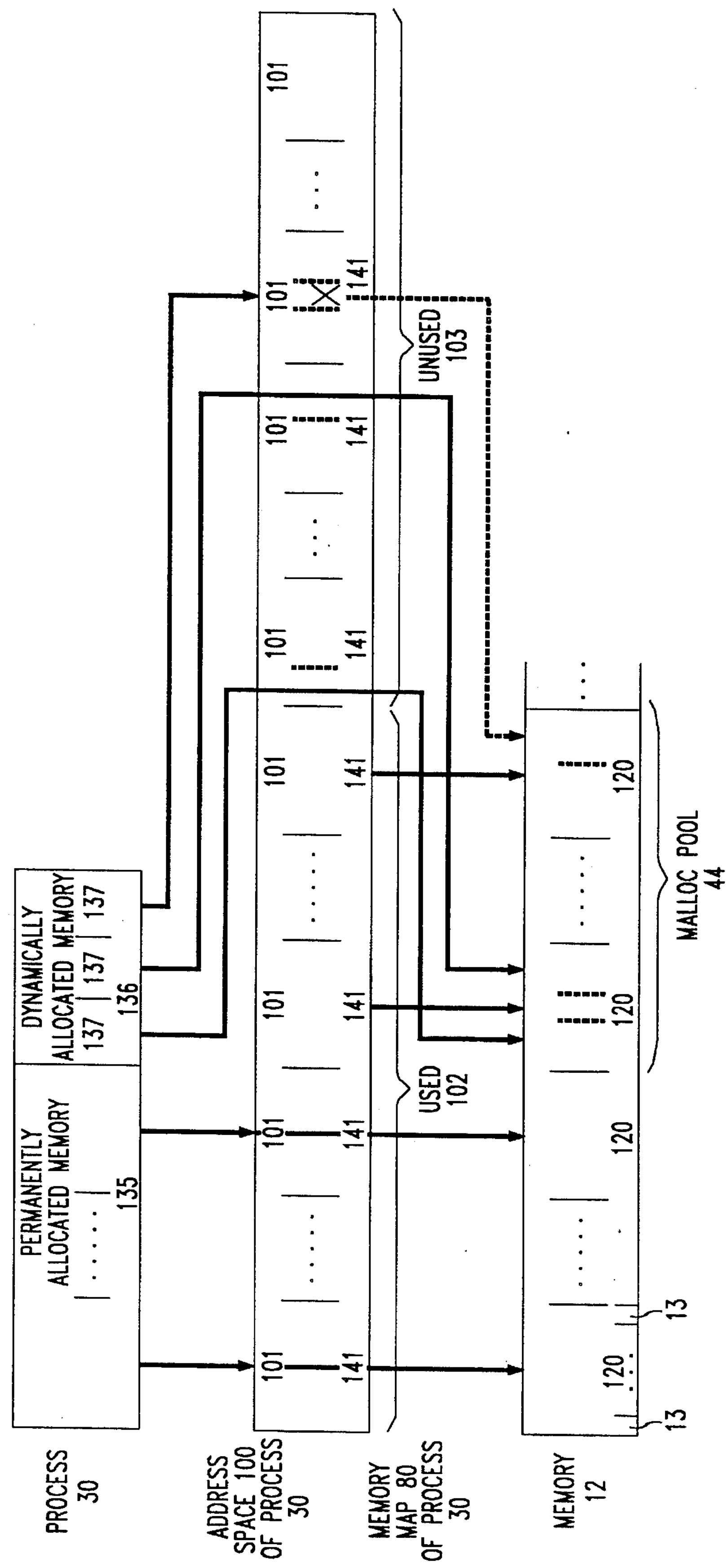
FIG. 3 is a logical block diagram of address mapping effected in the computer of FIG. 1.

The difference from conventional address mapping that is produced by the operation of malloc+42 for process 30 can be seen from a comparison of FIG. 2 with FIG. 3. There are now two virtual addresses from address space 100 that are mapped by memory map 80 onto the same locations in memory 12—one from the used portion 102, as is conventional, and a second one from the unused portion 103. The requesting subprogram 50–60 of process 30 has only been given the second address, from the unused portion 103, and is unaware of the first address from the used portion 102. Hence, in all of its memory 12 accesses, process 30 uses the second address, from the unused portion 103. Address translation function 41 translates this address into the corresponding address in memory 12 in the conventional manner, as shown in FIG. 6. Specifically, function 41 takes the "yes" leg of the decision branch at step 606 to step 608 of FIG. 6.

It should be noted from FIG. 3 that malloc+42 maps every dynamically allocated segment 137 to a different page 101 of unused portion 103, even if two or more of those allocated segments 137 lie in the same page 120 of memory 12. This ensures that every individual dynamic memory allocation for process 30 is represented in memory map 80 by a separate entry 141.

Figure 5:
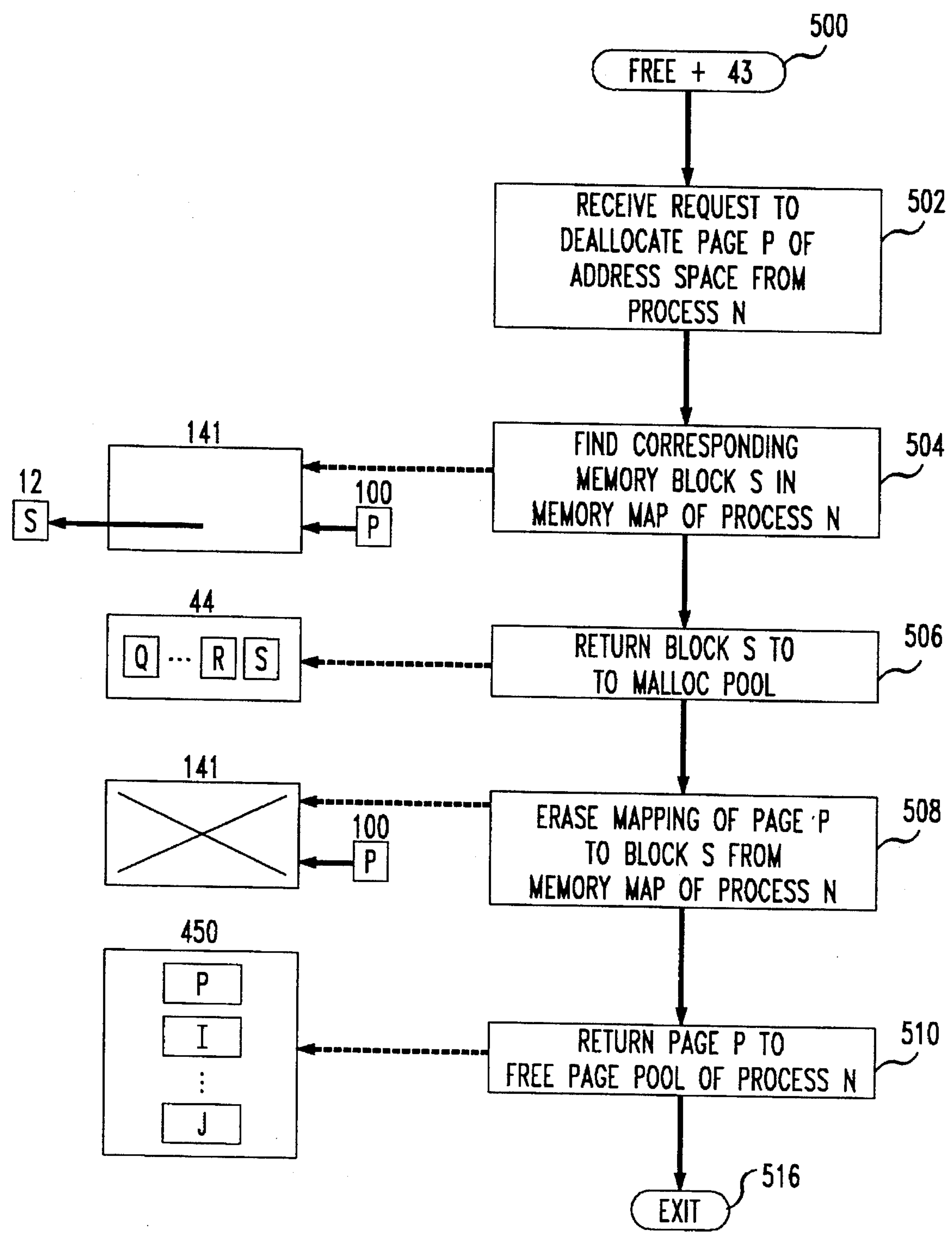
FIG. 5 is a functional flow diagram of the free+function of the computer of FIG. 1.

Turning now to FIG. 5, free+43 is invoked, at step 500, by a request for deallocation of dynamically allocated memory. Free+43 receives the request from process N (e.g., process 30) to deallocate a segment 137, at step 502. Process N identifies the segment 137 that is to be deallocated by the virtual memory address of page P 101 of unused portion 103 of process N's address space to which that segment 137 is mapped. Free+43 responds by accessing, in the memory map of process N, entry 141 of page P 101 whose address was given by process N to find therein the pointer to the corresponding block S of memory 12, at step 504. Free+43 then returns block S to malloc pool 44, at step 506, thereby making block S available for reallocation. Free+43 also erases or deletes the mapping of page P 101 to block S from entry 141 of process N's memory map that corresponds to page P 101, at step 508. As a consequence, that entry 141 ceases to point to block S, and the mapping of the page is canceled so that the corresponding P 101 again becomes a free page 101. Free +43 then returns that page P 101 to free page pool 450 of process N, at step 510. To maintain the least-recently-used ordering of free pages 101 in free page pool 450, free+43 enters page P 101 at the tail of the first-in/first-out queue that implements pool 450. Free+43 then exits, at step 512.

The effect produced by free+43 with respect to process 30 is shown in a dashed line in FIG. 3. The previously-existing correspondence between page P 101 and block S of memory 12 that was established in memory map 80 is now broken. Consequently, if process 30 has failed to delete all of its internal references to the now-deallocated segment 137—block S—and now attempts to access that deallocated segment 137, address translation function 41 fails to find a mapping of the deallocated segment's virtual address to a memory 12 address in memory map 80, and hence is unable to complete the address translation. Specifically, function 41 takes the "no" leg of the decision branch at step 606 to step 610 of FIG. 6. This event is conventionally trapped—reported as an error along with the state of computer 10 that existed at the time of the event's occurrence, at step 610, using existing facilities of the computer's operating system or environment. Hence, the improper access is prevented from occurring, thereby ensuring that neither the subprogram 50–60 of process 30 that was formerly allocated the memory block S, nor any other subprogram 50–60 of process 30 that is presently allocated that memory block, becomes corrupted. But even if the improper access would have been harmless, in the sense that it would have caused no actual corruption of either process, the error is nevertheless detected and reported. This "invisible bug" can therefore be corrected to make sure that it does not cause a problem in the future.

Since there is not an infinite number of pages 101 in unused portion 103 of address space 100, a previously-used page 101 of portion 103 will generally eventually have to be used again during dynamic memory allocation for process 30. Hence, this arrangement is not theoretically totally guaranteed to catch and prevent all accesses to deallocated memory. However, the least-recently-used mechanism of free page pool 450 ensures that such reuse occurs as seldom as possible. The larger the number of pages 101 is unused portion 103, and hence in free page pool 450, and the less frequent the invocation of malloc+42 by process 30, the greater the time interval is between reuse of an individual page 101 of unused portion 103 of address space 100, and the greater the consequent probability that an access to deallocated memory will be detected and prevented by this arrangement.

Of course, various changes and modifications to the illustrative embodiment described above will be apparent to those skilled in the art. For example, the addresses of locations and pages of memory 12 referred to herein need not be physical addresses, but may be virtual addresses of another layer of virtual memory addressing. Or, the invention need not be implemented within malloc and free, but may be implemented as an independent mechanism, for example, as an interface function between the processes that are making allocation and deallocation requests and conventional malloc and free. This could take the form of, e.g., a driver, a debugger, etc. Also, the arrangement need not be limited in use to detecting illegitimate memory references, but may be used to detect all memory references, as alluded to in the Summary of the Invention. Such changes and modifications can be made without departing from the spirit and the scope of the invention and without diminishing its attendant advantages. It is therefore intended that such changes and modifications be covered by the following claims.

We claim:

1. A dynamic memory allocation system having an address space comprising a plurality of non-overlapping address-space pages, each address-space page including a plurality of addresses of the address space, the system comprising:

a memory comprising a plurality of non-overlapping memory pages, each memory page including a plurality of memory locations each having a corresponding first address for use in accessing that memory location;

a memory map for representing a mapping of addresses from the address space to the memory locations, the memory map representing a mapping of the addresses from a first portion of the address space that presently resides in the memory to the memory locations;

memory allocating means (42) responsive to a dynamic memory allocation request, for allocating to a requestor a memory location from a memory page having at least one other memory location already allocated in response to another dynamic memory allocation request, mapping to the allocated memory location a second address from an address-space page none of whose included addresses are presently mapped to memory locations, and giving the second address to the requestor for referencing the allocated memory location;

memory deallocating means (43) responsive to a dynamic memory deallocation request, for deallocating the allocated memory location from the requestor and canceling the mapping of the second address to the deallocated memory location; and address translating means (41 ) responsive to the requestor referencing the deallocated memory location with the second address, for using the memory map to translate the second address to the deallocated memory location's first address, the address translating means failing to accomplish the translation if the mapping of the second address to the deallocated memory location is not represented in the memory map, whereby the reference by the requestor to the deallocated memory location is detected.

2. The system of claim 1 wherein:

the memory map represents a mapping of address-space pages to memory pages; and location to the requestor, an address-space page from a second portion the memory allocating means allocates at least one memory of the address space that excludes the first portion, which address-space page presently does not have any addresses mapped to memory locations, to the allocated at least one memory location, and gives at least one second address from the mapped address-space page from the second portion to the requestor for referencing the allocated at least one memory location; and the memory deallocating means deallocates the allocated at least one memory location from the requestor and cancels the mapping of the mapped address-space page from the second portion to the at least one deallocated memory location.

3. The system of claim 1 wherein:

the memory map is one of a plurality of memory maps, each corresponding to a different process and for representing a mapping of addresses from an address space of the corresponding process to the memory locations, and the requestor is either (a) one of a plurality of processes or (b) one of a plurality of subprograms of a process.

4. The system of claim 1 wherein:

the memory allocating means causes the mapping of the second address to the allocated memory location to be represented in the memory map; and the memory deallocating means for deallocating and canceling comprises means for deleting the mapping of the second address to the allocated memory location from the memory map.

5. The system of claim 1 wherein the memory allocating means (42) is responsive to a first dynamic memory allocation request for allocating to a requestor corresponding to the first request a first memory location in a memory page, mapping to the allocated first memory location a second address from a first address-space page none of whose included addresses are mapped to memory locations, and giving the second address from the first address-space page to the requestor corresponding to the first request for referencing the allocated first memory location, and the memory allocating means is further responsive to a second dynamic memory allocation request for allocating to a requestor corresponding to the second request a second memory location in the memory page, mapping to the allocated second memory location a second address from a second address-space page none of whose included addresses are mapped to memory locations and giving the second address from the second address-space page to the requestor corresponding to the second request for referencing the allocated second memory location.

6. A dynamic memory allocation system having an address space comprising a plurality of non-overlapping address-space pages, each address-space page including a plurality of addresses of the address space, the system comprising:

a memory comprising a plurality of non-overlapping memory pages, each memory page including a plurality of memory locations each having a corresponding first address for use in accessing that memory location;

a memory map for representing a mapping of addresses from the address space to the memory locations, the memory map representing a mapping of the addresses from a first portion of the address space that presently resides in the memory to the memory locations;

memory allocating means (42) responsive to a dynamic memory allocation request, for allocating to a requestor a memory location from a memory page having at least one other memory location already allocated in response to another dynamic memory allocation request, mapping in the memory map to the allocated memory location a second address from an address-space page none of whose included addresses are presently mapped to memory locations, and giving the second address to the requestor for referencing the allocated memory location;

address translating means (41) responsive to the requestor referencing the allocated memory location with the second address of the allocated memory location, for using the memory map to translate the second address of the allocated memory location to the allocated memory location's first address for use in accessing the referenced allocated memory location;

memory deallocating means (43) responsive to a dynamic memory deallocation request, for deallocating the allocated memory location from the requestor and deleting the mapping of the second address to the deallocated memory location from the memory map; and the address translating means further responsive to the requestor referencing the deallocated memory location with the second address of the deallocated memory location, for using the memory map to attempt to translate the second address of the deallocated memory location to the first address of the deallocated memory location and failing to accomplish the translation due to the deletion from the memory map by the memory deallocating means, whereby the reference by the requestor to the deallocated memory location is detected.

7. The system of claim 6 further comprising:

means responsive to the translation of the second address to the allocated memory location's first address, for using the first address to access the referenced allocated memory location; and wherein the address translating means includes means (610) responsive to a failed translation, for reporting the failure.

8. The system of claim 6 wherein:

the memory map is one of a plurality of memory maps each corresponding to a different process for representing a mapping of addresses from an address space of the corresponding process to the memory locations; and the requestor is either (a) one of a plurality of processes or (b) one of a plurality of subprograms of a process.

9. The system of claim 6 wherein the memory allocating means (42) is responsive to a first dynamic memory allocation request for allocating to a requestor corresponding to the first request a first memory location in a memory page, mapping to the allocated first memory location a second address from a first address-space page none of whose included addresses are mapped to memory locations, and giving the second address from the first address-space page to the requestor corresponding to the first request for referencing the allocated first memory location, and the memory allocating means is further responsive to a second dynamic memory allocation request for allocating to a requestor corresponding to the second request a second memory location in the memory page, mapping to the allocated second memory location a second address from a second address-space page none of whose included addresses are mapped to memory locations, and giving the second address from the second address-space page to the requestor corresponding to the second request for referencing the allocated second memory location.

10. The system of claim 6 wherein:

the memory map represents a mapping of address-space pages to memory pages; and the memory allocating means allocates at least one memory location to the requestor, maps an address-space page from a second portion of the memory space that excludes the first portion, which address-space page presently does not have any addresses mapped to memory locations, to the allocated at least one memory location in the memory map, and gives at least one second address from the mapped address-space page from the second portion to the requestor for referencing the allocated at least one memory location; and the memory deallocating means deallocates the allocated at least one memory location from the requestor and deletes the mapping of the mapped address-space page from the second portion to the at least one deallocated memory location from the memory map.

11. The system of claim 10 wherein:

the memory allocating means includes a pool (450) of address-space pages in the second portion which address-space pages presently, are not used, in that they do not have any addresses trapped to memory locations, the address-space pages being arranged in the pool in least-recently-used order, and means for mapping the at least one memory location to at least one second address of the least-recently-used address-space page that appears in the pool, and removing the least-recently-used address-space page from the pool; and the memory deallocating means includes means (510) for returning the address-space page which includes the at least one second address that was mapped to the deallocated at least one memory location, to the pool as a most-recently-used address-space page.

12. In a dynamic memory allocation system having a memory comprising a plurality of non-overlapping memory pages, each memory page including a plurality of memory locations each having a corresponding first address for use in accessing that memory location, an address space comprising a plurality of non-overlapping address-space pages, each address-space page including a plurality of addresses of the address space, a memory map for representing a mapping of addresses from the address space to the memory locations, the memory map representing a mapping of the addresses from a first portion of the address space that presently resides in the memory to the memory locations, a memory allocation means that responds to a memory allocation request by allocating a memory location to a requestor, a memory deallocation means that responds to a memory deallocation request by deallocating the allocated memory location from the requestor, and an address translation means that responds to the requestor referencing the allocated memory location with an address that is mapped to that allocated memory location, by using the memory map to translate the referencing address to the allocated memory location's first address, the improvement comprising:

said memory allocation means including means responsive to an allocation of a memory location to a requestor in response to a memory allocation request, the allocated memory location being from a memory page having at least one other memory location already allocated in response to another memory allocation request, for mapping to the allocated memory location a second address from an address-space page none of whose included addresses are presently mapped to memory locations, and giving the second address to the requestor for referencing the allocated memory location; and said memory deallocation means including means responsive to a deallocation of the allocated memory location from the requestor, for canceling the mapping of the second address to the deallocated memory location;

whereby an attempt, by the translation means in response to the requestor referencing the deallocated memory location with the second address of the deallocated memory location, to use the memory map to translate the second address of tile deallocated memory location to the first address of the deallocated memory location fails if the mapping of the second address is not represented in the memory map, and the reference by the requestor to the deallocated memory location is detected in consequence of the failure.

13. The arrangement of claim 12 wherein the means for mapping a second address is responsive to an allocation, in response to .a first dynamic memory allocation request, of a first memory location in a memory page to a requestor corresponding to the first request, for mapping to the allocated first memory location a second address from a first address-space page none of whose included addresses are mapped to memory locations, and giving the second address from the first address-space page to the requestor corresponding to the first request for referencing the allocated first memory location, and the means for mapping a second address is further responsive to an allocation, in response to a second dynamic memory allocation request, of a second memory location in the memory page to a requestor corresponding to the second request, for mapping to the allocated second memory location a second address from a second address-space page none of whose included addresses are mapped to memory locations, and giving the second address from the second address-space page to the requestor corresponding to the second request for referencing the allocated second memory location.

14. The improvement in a dynamic memory allocation system, as in claim 12 wherein:

the mapping means responds to the allocation of the memory location to the requestor representing the mapping of the second address to the allocated memory location in the memory map; and the canceling means comprises means responsive to the deallocation of the memory location from the requestor, for deleting the mapping of the second address to the deallocated memory location from the memory map;

whereby an attempt, by the translation means in response to the requestor referencing the deallocated memory location with the second address, to use the memory map to translate the second address to the first address of the deallocated memory location fails due to the deletion from the memory map made by the deleting means, and the reference by the requestor to the deallocated memory location is detected in consequence of the failure.

15. The improvement in a dynamic memory allocation system, as in claim 14 wherein the memory map represents a mapping of address-space pages to memory pages, the memory allocation means allocates at least one memory location to the requestor, and the memory deallocation means deallocates the at least one allocated memory location from the requestor, wherein:

the means for mapping maps an address-space page from a second portion of the address space that excludes the first portion, which address-space page presently does not have any addresses mapped to memory locations, to the allocated at least one memory location in the memory map, and gives at least one second address from the mapped address-space page from the second portion to the requestor for referencing the allocated at least one memory location; and the means for deleting deletes the mapping of the mapped address-space page from the second portion to the at least one deallocated memory location from the memory map.

16. The improvement in a dynamic memory allocation system, as in claim 15 wherein:

the means for mapping includes a pool (450) of address-space pages in the second portion which address-space pages presently are not used, in that they do not have any addresses mapped to memory locations, the address-space pages arranged in the pool in least-recently-used order; and means (408–412) for mapping the at least one memory location to at least one second address of the least-recently-used address-space page that appears in the pool, and removing the least-recently-used address-space page from the pool; and the memory deallocation means includes means (510) for returning the address-space page which includes the at least one second address that was mapped to the deallocated at least one memory location, to the pool as a most-recently-used address-space page.

17. A method of detecting a reference by a requestor to a memory location in a dynamic memory allocation system having a memory comprising a plurality of non-overlapping memory pages, each memory page including a plurality of memory locations each having a corresponding first address for use in accessing the memory location, an address space comprising a plurality of non-overlapping address-space pages, each address-space page including a plurality of addresses of the address space, and a memory map for representing a mapping of addresses from the address space to the memory locations, the memory map representing a mapping of the addresses from a first portion of the address space that presently resides in the memory to the memory locations, the method comprising the steps of:

in response to a dynamic memory allocation request, allocating to a requestor a memory location from a memory page having at least one other memory location already allocated in response to another dynamic memory allocation request, mapping a second address, from an address-space page none of whose included addresses are presently mapped to memory locations, to the allocated memory location, and giving the second address to the requestor for referencing the allocated memory location;

in response to a dynamic memory deallocation request, deallocating the allocated memory location from the requestor, and canceling the mapping of the second address to the deallocated memory location; and in response to the requestor referencing the deallocated memory location with the second address, using the memory map to translate the second address to the deallocated memory location's first address, and failing to accomplish the translation if the mapping of the second address to the deallocated memory location is not represented in the memory map, whereby the reference by the requestor to the deallocated memory location is detected.

18. The method of claim 17 in a system wherein the memory map represents a mapping of address-space pages to memory pages, wherein:

the step of allocating comprises the step of allocating at least one memory location to the requestor;

the step of mapping comprises the step of mapping an address-space page from a second portion of the address space that excludes the first portion, which address-space page presently does not have any addresses mapped to memory locations, to the allocated at least one memory location;

the step of giving comprises the step of giving at least one second address from the mapped address-space page from the second portion to the requestor for referencing the allocated at least one memory location;

the step of deallocating comprises the step of deallocating the allocated at least one memory location from the requestor; and the step of canceling comprises the step of deleting the mapping of the mapped address-space page from the second portion to the at least one deallocated memory location.

19. The method of claim 17 in a system wherein the memory map is one of a plurality of memory maps, each corresponding to a different process, for representing a mapping of addresses from an address space of the corresponding process to the memory locations, and the requestor is either (a) one of a plurality of processes or (b) one of a plurality of subprograms of a process.

20. The method of claim 17 wherein:

the step of mapping comprises the step of representing the mapping of the second address to the allocated memory location in the memory map; and the step of canceling comprises the step of deleting the mapping of the second address to the allocated memory location from the memory map.

21. The method of claim 17 wherein:

the steps of allocating, mapping, and giving in response to a dynamic memory allocation request respectively comprise the steps of in response to a first dynamic memory allocation request, allocating to a requestor corresponding to the first request a first memory location in a memory page, mapping to the allocated first memory location a second address from a first address-space page none of whose included addresses are mapped to memory locations, and giving the second address from the first address-space page to the requestor corresponding to the first request for referencing the allocated first memory location; and the steps of allocating, mapping, and giving in response to a dynamic memory allocation request further respectively comprise the steps of in response to a second dynamic memory allocation request, allocating to a requestor corresponding to the second request a second memory location in the memory page that includes the first memory location, mapping to the allocated second memory location a second address frown a second address-space page none of whose included addresses are mapped to memory locations, and giving the second address from the second address-space page to the requestor corresponding to the second request for referencing the allocated second memory location.

22. A method of detecting a reference by a requestor to a deallocated memory location in a dynamic memory allocation system having a memory comprising a plurality of non-overlapping memory pages, each memory page including a plurality of memory locations each having a corresponding first address for use in accessing the memory location, an address space comprising a plurality of non-overlapping address-space pages, each address-space page including a plurality of addresses of the address space, and a memory map for representing a mapping of addresses from the address space to the memory locations, the memory map representing a mapping of the addresses from a first portion of the address space that presently resides in the memory to the memory locations, the method comprising the steps of:

in response to a dynamic memory allocation request, allocating to a requestor a memory location from a memory page having at least one other memory location already allocated in response to another dynamic memory allocation request, mapping a second address, from an address-space page none of whose included addresses are presently mapped to memory locations, to the allocated memory location in the memory map, and giving the second address to the requestor for referencing the allocated memory location;

in response to the requestor referencing the allocated memory location with the second address, using the memory map to translate the second address to the allocated memory location's first address, and using the first address to access the allocated referenced memory location;

in response to a dynamic memory deallocation request, deallocating the allocated memory location from the requestor, and deleting the mapping of the second address to the deallocated memory location from the memory map; and in response to the requestor referencing the deallocated deallocated memory location with the second address, using the memory map in an attempt to translate the second address to the deallocated deallocated memory location's first address, and failing in the attempt due to the deletion from the memory map, whereby the reference by the requestor to the deallocated memory location is detected.

23. The method of claim 22 further comprising the steps of:

in response to the translating of the second address to the allocated memory location's first address, using the first address to access the referenced allocated memory location; and in response to a failed translation, reporting the failure.

24. The method of claim 22 in a system wherein the memory map is one of a plurality of memory maps, each corresponding to a different process, for representing a mapping of addresses from an address space of the corresponding process to the memory locations, and the requestor is one of (a) one of a plurality of processes and (b) one of a plurality of subprograms of a process.

25. The method of claim 22 wherein:

the steps of allocating, mapping, and giving in response to a dynamic memory allocation request respectively comprise-the steps of in response to a first dynamic memory allocation request, allocating to a requestor corresponding to the first request a first memory location in a memory page, mapping to the allocated first memory location a second address from a first address space page none of whose included addresses are mapped to memory locations, and giving the second address from the first address-space page to the requestor corresponding to the first request for referencing the allocated first memory location; and the steps of allocating, mapping, and giving in response to a dynamic memory allocation request further respectively comprise the steps of in response to a second dynamic memory allocation request, allocating to a requestor corresponding to the second request a second memory location in the memory page that includes the first memory location, mapping to the allocated second memory location a second address from a second address-space page none of whose included addresses are mapped to memory locations, and giving the second address from the second address-space page to the requestor corresponding to the second request for referencing the allocated second memory location.

26. The method of claim 22 in a system wherein the memory map represents a mapping of address-space pages to memory pages, wherein:

the step of allocating comprises the step of allocating at least one memory location to the requestor, the step of mapping comprises the step of mapping address-space page from a second portion of the address space that excludes the first portion, which address-space page presently does not have any addresses mapped to memory from a second portion of the address space that excludes the first portion, which address-space page presently does not have any addresses mapped to memory locations, to the allocated at least one memory location in the memory map;

the step of giving comprises the step of giving at least one second address from the mapped address-space page from the second portion to the requestor for referencing the allocated at least one memory location;

the step of deallocating comprises the step of deallocating the allocated at least one memory location from the requestor; and the step of deleting comprises the step of deleting the mapping of the mapped address-space page from the second portion to the at least one deallocated memory location from the memory map.

27. The method of claim 26 wherein:

the step of mapping an address-space page includes the steps of removing a least-recently-used address-space page from a pool of address-space pages in the second portion which address-space pages are presently not used, in that they do not have any addresses mapped to memory locations, the address-space pages being arranged in the pool in least-recently-used order, and mapping the at least one memory location to at least one second address of the least-recently-used address-space page; and the step of deallocating includes the step of returning the address-space page which includes the at least one second address that was mapped to the deallocated at least one memory location, to the pool as a most-recently-used address-space page.

* * * * *